United States Patent Office 2,879,265
Patented Mar. 24, 1959

2,879,265

DISAZO DYESTUFFS AND THEIR METAL COMPLEX COMPOUNDS

Willy Steinemann, Basel, Switzerland, assignor to Sandoz A.G., Basel, Switzerland, a Swiss firm No Drawing. Application December 12, 1957
Serial No. 702,258

Claims priority, application Switzerland
December 21, 1956

7 Claims. (Cl. 260—147)

This invention relates to disazo dyestuffs and their metal complex compounds, which in the metal-free state correspond to the general formula

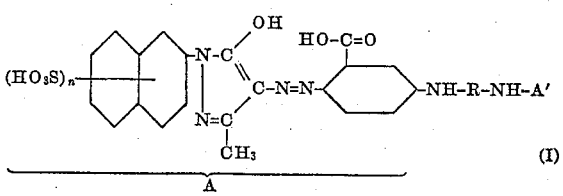

wherein:

$n$ stands for one of the integers 1 and 2,
A' stands for a radical of formula A,
R stands for the radical of a dibasic organic acid which contains at least one carbon double bond and may contain further substituents, and wherein the two radicals A and A' may be identical or different from each other.

Especially valuable are the disazo dyestuffs and the metal complex compounds thereof which in the metal-free state correspond to Formula I, wherein A and A' are identical and R stands for the radical of fumaric acid, muconic acid or terephthalic acid.

A process for the production of the new disazo dyestuffs consists in reacting 2 mols of an aminomonoazo compound of the formula

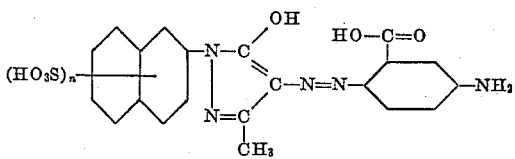

wherein $n$ stands for one of the integers 1 and 2, or 2 mols of a mixture in any desired proportions of two aminomonoazo compounds of the same type, these aminomonoazo compounds being in the metallized or unmetallized state, with 1 mol of a functional derivative of a dicarboxylic acid of the formula

HO—R—OH    (III)

wherein R possesses the aforenamed meaning, and treating the resultant disazo dyestuff, when it contains further metallizable groupings, with a metal-yielding agent, either in substance if it contains four sulfonic acid groups or on the dyeing substrate if it contains from two to four sulfonic acid groups.

The aminomonoazo compound or compounds of Formula II are obtained by coupling 1 mol of diazotized 1-amino-4-nitrobenzene-2-carboxylic acid with 1 mol of a 1 - naphthyl(2') - 3 - methyl - 5 - pyrazolonemono- or -disulfonic acid and subsequently reducing the nitro group to the amino group.

Another suitable mode of operation for the production of these disazo dyestuffs is to tetrazotize 1 mol of the diamino compound, which is obtained by the reaction of 2 mols of 1-nitro-4-aminobenzene-2-carboxylic acid with 1 mol of a functional derivative of a dicarboxylic acid of Formula III and subsequent reduction of the two nitro groups in the so-formed dinitro compound to amino groups, and to couple the tetrazo compound with 2 mols of a 1-naphthyl(2')-3-methyl-5-pyrazolonemono- or -disulfonic acid or with 2 mols of a mixture in any proportions of two coupling components of this type. The disazo dyestuff thus formed is treated with a metal-yielding agent, either in substance if it contains four sulfonic acid groups or on the dyeing substrate if it contains from two to four sulfonic acid groups.

In this context the term "functional derivatives of dicarboxylic acids" refers primarily to the halides and more especially to the chlorides. Thus the following reactants enter into immediate consideration: fumaric acid dichloride, chlorofumaric acid dichloride, bromofumaric acid dichloride, mesaconic acid dichloride, butadiene-1.4-dicarboxylic acid chloride, 1.4-dichlorobutadiene-1.4-dicarboxylic acid chloride, 2-methylbutadiene-1.4-dicarboxylic acid chloride, benzene-1.4-dicarboxylic acid chloride, 2-methyl-, 2.5-dichloro-, 2-acetylamino-, 2-carbethoxy-aminobenzene-1.4-dicarboxylic acid chloride.

The reaction of the aminomonoazo compound with the functional of a dicarboxylic acid derivative of Formula III according to the first mode of operation of the process is carried out preferably in aqueous solution and in presence of an acid-binding agent, e. g. sodium acetate, lithium carbonate, sodium carbonate, sodium borate or sodium hydroxide. The corresponding potassium compounds as well as selected magnesium and earth-alkali metal compounds also give good service.

When the second mode of operation is adopted the preferred procedure is to indirectly tetrazotize the dicarboxylic acid anilide, which contains amino groups in para-position to the imino groups and carboxylic acid groups in ortho-position to these amino groups. The coupling of the tetrazo compound with 1-naphthyl(2')-3-methyl-5-pyrazolonemono- or -disulfonic acid is best performed in weakly alkaline, e. g. soda alkaline, medium. The metal-free disazo dyestuffs are characterized by very good stability to salt and hard water. They possess good affinity for cotton and fibers of regenerated cellulose and also for leather. On application to these materials by the topchrome process, they produce yellowish orange shades which are fast to light, washing, perspiration, alkali, gas fumes, and wet pressing, stable to resin crease-resist finishes, and readily dischargeable with alkaline pastes.

For metallizing the disazo compounds in substance preference is given to copper- or nickel-yielding agents. The metal complex compounds possess good stability to salt, hard water and heavy metals. They draw very well onto fibers of natural or regenerated cellulose, and leather. Wool and polyamide fibers are largely reserved, while a very good reserve is obtained of cellulose acetate, polyester fibers and polyacrylonitrile fibers. The yellowish orange dyeings or prints are notable for good fastness to light, washing, perspiration, water, sea water, hard water, water spotting, alkalis, soda boiling, sulfite, formaldehyde, gas fumes, dry crocking, wet pressing, acetic acid, and scrooping. They are readily dischargeable with alkaline pastes and are stable to heat and crease-resist finishes.

In the examples which follow the parts and percentages are by weight and the temperatures in degrees centigrade.

Example 1

To 500 parts of a 2.5% copper sulfate solution of strongly ammonia alkaline reaction at 70–80° are added 27 parts of the aminomonoazo compound obtained by coupling 1 mol of diazotized 1-amino-4-nitrobenzene-2-carboxylic acid with 1 mol of 1-naphthyl(2')-3-methyl-5-pyrazolone-5'.7'-disulfonic acid and reducing the nitro group to the amino group. On complete formation of the complex the metal-containing aminomonoazo compound is salted out and filtered off. The filter cake is dissolved in 200 parts of water, to which are added 15 parts of crystallized sodium acetate and 100 parts of ice. Gradual addition of a 20% solution of fumaric acid dichloride in chlorobenzene is continued over a period of 3 hours until the aminomonoazo compound is no longer indicated in the reaction solution. The metal-containing disazo dyestuff is precipitated by the addition of salt and is then filtered off, washed and dried. It is a brown powder which dissolves in water to give yellow-brown solutions and in concentrated sulfuric acid yellow solutions. The yellowish orange dyeings which it gives on cotton and fibers of regenerated cellulose possess outstanding fastness to light, washing and perspiration. They are stable to resin crease-resist finishes.

When the fumaric acid dichloride of the preceding example is replaced by butadiene-1.4-dicarboxylic acid chloride, a dyestuff of yet higher affinity for cotton and fibers of regenerated cellulose is obtained.

Example 2

19.2 parts of the dicarboxylic acid anilide of formula

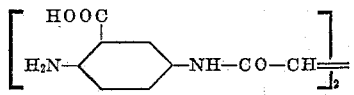

are dissolved in 200 parts of water by means of 3.7 parts of lithium carbonate. 7 parts of sodium nitrite are added to the solution, which is then poured into a mixture of 35 parts of 30% hydrochloric acid, 35 parts of water and 200 parts of ice. On completion of tetrazotization the excess nitrous acid is destroyed. The solution of the tetrazo compound is added to an ice-cold solution of 39 parts of 1-naphthyl(2')-3-methyl-5-pyrazolone-5'.7'-disulfonic acid and 40 parts of anhydrous soda in 400 parts of water. When coupling is finished the new disazo dyestuff is salted out, filtered off and dried. It is an orange-red powder which dissolves with a yellow coloration in water and concentrated sulfuric acid. Upon aftertreatment with copper-yielding agents the yellowish orange dyeings on cotton, fibers of regenerated cellulose and leather possess very good fastness to light, washing and perspiration, and are stable to crease-resist finishes.

When the 39 parts of 1-naphthyl(2')-3-methyl-5-pyrazolone-5'.7'-disulfonic acid of the preceding example are replaced by an equivalent quantity of 1-naphthyl(2')-3-methyl-5-pyrazolone-6'-sulfonic acid or 1-naphthyl(2')-3-methyl-5-pyrazolone-4'.8'-disulfonic acid, similar dyestuffs of slightly lower solubility are obtained.

Example 3

29 parts of the disazo dyestuff produced in accordance with Example 2, paragraph 1, are dissolved in 600 parts of water at 80°. 20 parts of a 26% aqueous solution of ammonia are added, followed in the space of 15 minutes by a solution of 12.5 parts of crystallized copper sulfate in 100 parts of water. The whole is stirred at 70–80° until complex formation is completed. The isolated and dried copper-containing disazo dyestuff is identical with the product of Example 1.

Example 4

29 parts of the disazo dyestuff obtained according to Example 2, paragraph 1, are dissolved in 600 parts of water at 80°. The solution receives an addition of 20 parts of a 26% aqueous ammonia solution, and in the course of the next 15 minutes a solution of 14.1 parts of crystallized nickel sulfate ($NiSO_4.7H_2O$) in 100 parts of water. The whole is stirred at 70–80° until complex formation is completed. The isolated and dried nickel-containing disazo dyestuff is very similar to the product obtained according to Example 3.

Example 5

27 parts of the aminomonoazo compound, which is obtained by coupling 1 mol of diazotized 1-amino-4-nitrobenzene-2-carboxylic acid with 1 mol of 1-naphthyl(2')-3-methyl-5-pyrazolone-5'.7'-disulfonic acid and then reducing the nitro group to the amino group, are added to 500 parts of a 2.5% copper sulfate solution of strongly ammonia alkaline reaction at 70–80°. On formation of the complex the metal-containing aminomonoazo compound is salted out, filtered off, and the filter cake dissolved in 300 parts of warm water. 27 parts of crystallized sodium acetate and 20 parts of chlorobenzene are added and the solution heated to 80–85°. At this temperature finely powdered benzene-1.4-dicarboxylic acid chloride is strewn into the solution in small portions over a period of 1 hour until the aminomonoazo compound is no longer indicated. The new metal-containing disazo dyestuff is precipitated from the reaction solution by the addition of salt and then filtered off, washed and dried. It is a brown powder giving yellow-brown solutions in water and yellow solutions in concentrated sulfuric acid. Its yellowish orange dyeings on cotton and fibers of regenerated cellulose possess outstanding fastness to light, washing and perspiration, and are stable to crease-resist finishes.

Example 6

23 parts of the aminomonoazo compound, which is obtained by coupling 1 mol of diazotized 1-amino-4-nitrobenzene-2-carboxylic acid with 1 mol of 1-naphthyl(2')-3-methyl-5-pyrazolone-6'-sulfonic acid and subsequently reducing the nitro group to the amino group, are dissolved in 400 parts of water. After the addition of 30 parts of crystallized sodium acetate and 20 parts of chlorobenzene the solution is heated to 80–85°, and during the next hour small portions of finely powdered benzene-1.4-dicarboxylic acid chloride are strewn into it until no further diazotizable amino groups are indicated. The new disazo dyestuff is precipitated from the solution, filtered off, washed, dried and ground. It is an orange powder which dissolves in concentrated sulfuric acid and water with a yellow coloration. Following aftertreatment with copper-yielding agents, the yellowish orange dyeings on fibers of natural or regenerated cellulose and leather, possess excellent fastness to light, washing and perspiration, and are stable to crease-resist finishes.

The following table contains the characterizing data of further disazo dyestuffs and their metal-complex compounds, which in the metal-free state correspond to Formula I. They are obtainable according to the procedures described in Examples 1 to 6 and are distinguished in the table by the value of $n$ and the position or positions of the sulfonic acid group or groups, the dicarboxylic acid halide corresponding to the radical R, the application form of the dyestuffs and the shade of the metallized dyeings on cotton. The abbreviations in the penultimate column stand for:

Aftercopp.=Aftercoppering dyestuff
Cu=Copper complex dyestuff
Ni=Nickel complex dyestuff

| Example No. | $n$ | Positions of $SO_3H$ | | Dicarboxylic Acid Halide corresponding to the Radical R | Application Form of the Dyestuffs | Shade of Metallized Dyeing on Cotton |
|---|---|---|---|---|---|---|
| 7 | 2 | 6 | 8 | benzene-1.4-dicarboxylic acid chloride. | Cu | yellowish orange. |
| 8 | 2 | 4 | 8 | ...do... | Aftercopp. | Do. |
| 9 | 2 | 6 | 8 | fumaric acid dibromide. | Cu | Do. |
| 10 | 2 | 6 | 8 | chlorofumaric acid dichloride. | Ni | yellow. |
| 11 | 2 | 5 | 7 | bromofumaric acid dichloride. | Cu | orange yellow. |
| 12 | 2 | 5 | 7 | mesaconic acid dichloride. | Ni | yellow. |
| 13 | 2 | 5 | 7 | 1.4-dichlorobutadiene-1.4-dicarboxylic acid chloride. | Cu | orange yellow. |
| 14 | 1 | 8 |  | 2-methylbutadiene-1.4-dicarboxylic acid chloride. | Aftercopp. | Do. |
| 15 | 2 | 4 | 8 | butadiene-1.4-dicarboxylic acid chloride. | ...do... | Do. |
| 16 | 2 | 4 | 8 | 2-methylbenzene-1.4-dicarboxylic acid chloride. | ...do... | Do. |
| 17 | 1 | 5 |  | 2-acetylaminobenzene-1.4-dicarboxylic acid chloride. | ...do... | Do. |
| 18 | 2 | 6 | 8 | 2.5-dichlorobenzene-1.4-dicarboxylic acid chloride. | ...do... | Do. |
| 19 | 2 | 5 | 7 | 2-carbethoxyaminobenzene-1.4-dicarboxylic acid chloride. | ...do... | Do. |

Example 20

19.2 parts of the dicarboxylic acid anilide of formula

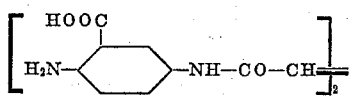

are dissolved in 200 parts of water by means of 3.7 parts of lithium carbonate. 7 parts of sodium nitrite are added to the solution, which is then poured into a mixture of 35 parts of 30% hydrochloric acid, 35 parts of water and 200 parts of ice. On completion of tetrazotization the excess nitrous acid is destroyed. The solution of the tetrazo compound is added to an ice-cold solution of 19.5 parts of 1-naphthyl(2')-3-methyl-5-pyrazolone-5'.7'-disulphonic acid, 19.5 parts of 1-naphthyl(2')-3-methyl-5-pyrazolone-6'.8'-disulfonic acid and 40 parts of anhydrous soda in 400 parts of water. When coupling is finished the new disazo dyestuff mixture is salted out, filtered off and converted into the copper complex compound according to the details given in Example 3. The new disazo dyestuff mixture is a brown powder which dissolves in water to give yellow-brown solutions and in concentrated sulfuric acid yellow solutions. The yellowish orange dyeings which it gives on cotton and fibers of regenerated cellulose possess outstanding fastness to light, washing and perspiration. They are stable to resin crease-resist finishes.

Example 21

If the mixture of coupling components of Example 20 is replaced by a mixture of 19.5 parts of 1-naphthyl(2')-3-methyl-5-pyrazolone-4'.8'-disulfonic acid and 15.5 parts of 1-naphthyl(2')-3-methyl-5-pyrazolone-6'-sulfonic acid, the resultant disazo dyestuff mixture dyes cotton and fibers of regenerated cellulose in yellowish orange shades, whose fastness to light, washing and perspiration is greatly improved by an aftertreatment with copper-yielding agents.

Example 22

1 part of the metal-free disazo dyestuff produced according to Example 2 is dissolved in 200 parts of distilled water at 100°. The solution is poured into 3000 parts of water, to which are added 30 parts of anhydrous sodium sulfate. 100 parts of previously wetted cotton sateen are entered into this liquor at 50–60°. The temperature is raised to 90–95° and the dye liquor maintained at this temperature for 30 minutes, then allowed to boil for a further 15 minutes. The bath is cooled to 75° and the dyed goods removed and rinsed.

The material is aftertreated for 20 minutes in a bath at 60° composed of 2000 parts of water, 3 parts of crystallized copper sulfate and 3 parts of acetic acid. On removal it is rinsed and dried.

Dyeings of metallizable or metallized dyestuffs can also be aftertreated as follows: The dyed goods are entered into a bath of 2.5 parts of a copper-containing condensation product based on dicyanodiamide and 2500 parts of water at 60–70° and kept in constant movement for 30 minutes. On removal the coppered dyeing is rinsed and dried.

Formulae of representative dyestuffs of the foregoing examples are as follows:

*Example 1 (first paragraph) and Example 3*

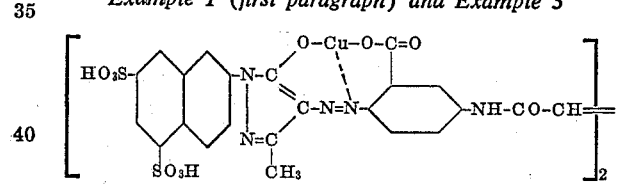

*Example 1 (second paragraph)*

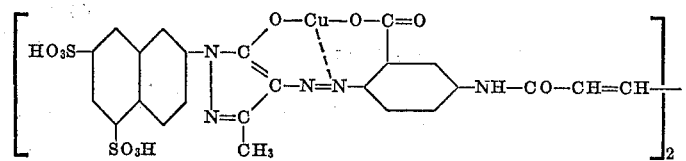

*Example 2 (first paragraph)*

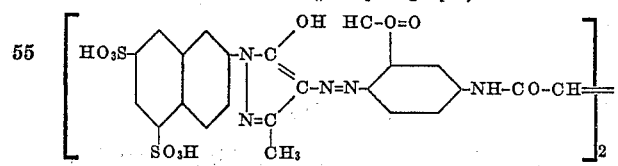

*Example 2 (second paragraph)*

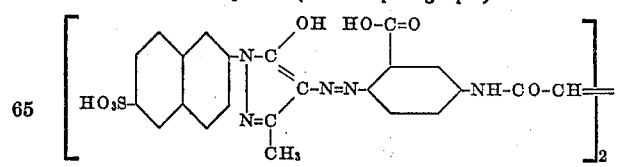

and

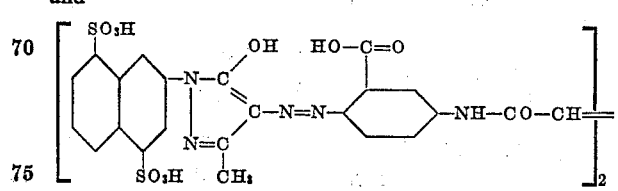

*Example 4*

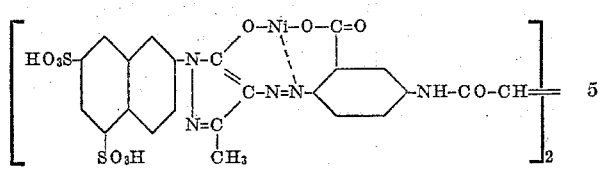

*Example 5*

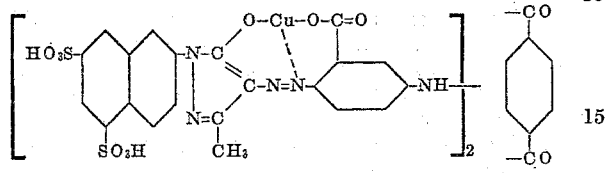

*Example 6*

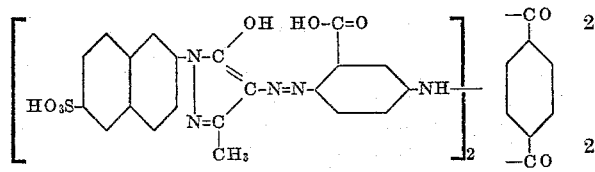

*Example 7*

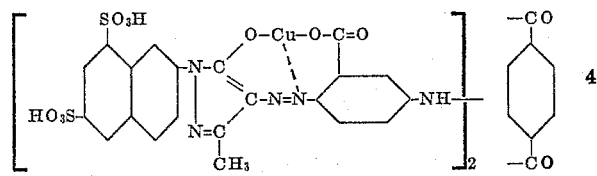

*Example 15*

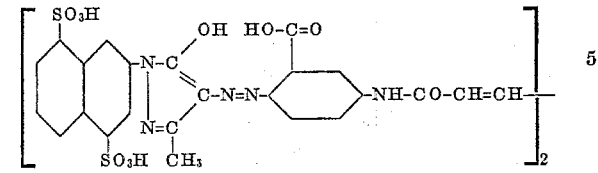

*Example 20*

The most important dyestuff of this mixture is the asymmetrical dyestuff corresponding to the formula

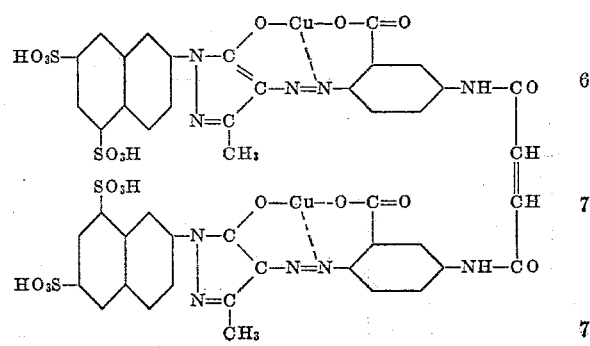

*Example 21*

The most important dyestuff of this mixture is the asymmetrical dyestuff corresponding to the formula

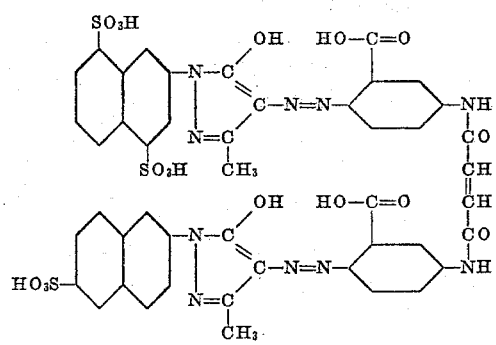

Having thus disclosed the invention what is claimed is:

1. A member selected from the group consisting of the disazo dyestuffs which in the metal-free state correspond to the formula

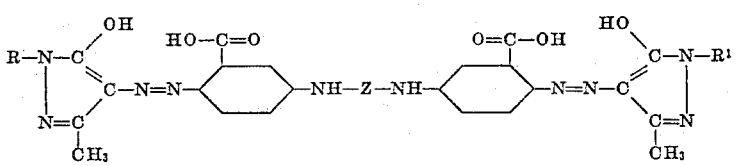

and the copper and the nickel complex compounds thereof, wherein each of R and $R^1$ stands for the radical of a member selected from the group consisting of naphthalenemonosulfonic acid and naphthalenedisulfonic acid radicals attached to the adjacent N— at the 2-position of the naphthalene nucleus, and Z stands for the radical of a dibasic organic acid which contains at least one carbon-to-carbon double bond and at most three carbon-to-carbon double bonds and not more than 8 carbon atoms, the three carbon-to-carbon double bonds being in an aromatic cyclic nucleus.

2. A member selected from the group consisting of disazo dyestuffs which in the metal-free state correspond to the formula

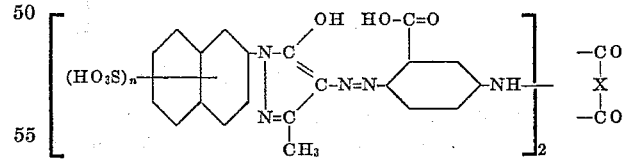

and the copper and the nickel complex compounds thereof, wherein $n$ stands for one of the integers 1 and 2 and X represents a member selected from the group consisting of the radicals —CH=CH—, —CH=CH—CH=CH— and

3. The copper complex dyestuff which corresponds to the formula

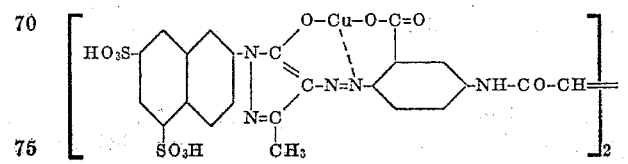

4. The copper complex dyestuff which corresponds to the formula

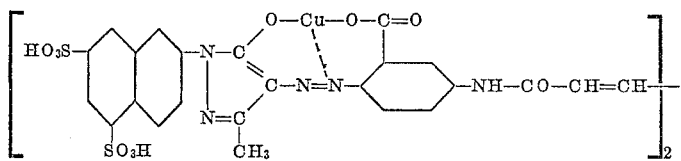

5. The copper complex dyestuff which corresponds to the formula

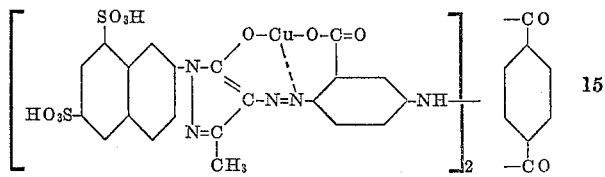

6. The disazo dyestuff which corresponds to the formula

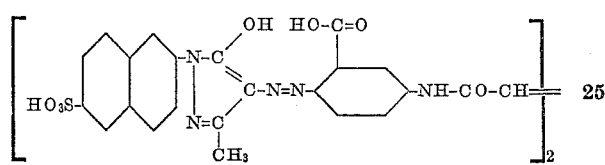

7. The disazo dyestuff which corresponds to the formula

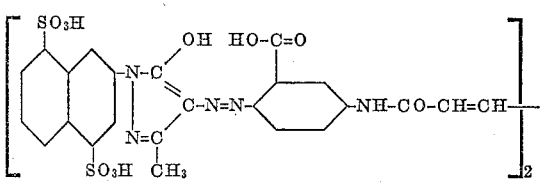

References Cited in the file of this patent

UNITED STATES PATENTS

| | | |
|---|---|---|
| 2,734,053 | Grandjean et al. | Feb. 7, 1956 |
| 2,813,852 | Grandjean et al. | Nov. 19, 1957 |

FOREIGN PATENTS

| | | |
|---|---|---|
| 312,858 | Switzerland | Apr. 14, 1956 |
| 312,860 | Switzerland | Apr. 14, 1956 |

UNITED STATES PATENT OFFICE
Certificate of Correction

March 24, 1959

Patent No. 2,879,265

Willy Steinemann

It is hereby certified that error appears in the printed specification of the above numbered patent requiring correction and that the said Letters Patent should read as corrected below.

Column 2, line 29, for "boyxlic" read —boxylic—; line 34, for "functional of a dicarboxylic acid derivative" read —functional derivative of a dicarboxylic acid—; column 6, lines 53 to 59, under the heading Example 2 (first paragraph), right-hand portion of the formula, for Signed and sealed this 3rd day of November 1959.

[SEAL]

Attest:
KARL H. AXLINE,
Attesting Officer.

ROBERT C. WATSON,
Commissioner of Patents.